United States Patent [19]

Shiba

[11] 4,380,030
[45] Apr. 12, 1983

[54] MAGNETIC TAPE CASSETTE

[75] Inventor: Haruo Shiba, Saku, Japan

[73] Assignee: TDK Electronics Co., Ltd., Tokyo, Japan

[21] Appl. No.: 274,198

[22] Filed: Jun. 16, 1981

Related U.S. Application Data

[63] Continuation of Ser. No. 79,194, Sep. 26, 1979, abandoned.

[30] Foreign Application Priority Data

Nov. 20, 1978 [JP] Japan ............................ 53-158695

[51] Int. Cl.³ ...................... G11B 15/04; G11B 23/06
[52] U.S. Cl. ...................................... 360/132; 360/60
[58] Field of Search ........................... 360/60, 66, 132

[56] References Cited

U.S. PATENT DOCUMENTS 4,044,386  8/1977  Satou et al. ........................... 360/60

Primary Examiner—John H. Wolff
Attorney, Agent, or Firm—Oblon, Fisher, Spivak, McClelland & Maier

[57] ABSTRACT

A fitting piece is adapted to fit in a recess for receiving an actuation pin of a recorder. The fitting piece comprises a middle portion; a pair of legs vertically extending the ends of the middle portion; and a cooperative lug formed on the leg. The fitting piece can be fitted into the recess in two different positions either permitting recording or preventing cancellation of the recorded sound.

3 Claims, 7 Drawing Figures

MAGNETIC TAPE CASSETTE

This is a continuation of application Ser. No. 079,194, filed Sept. 26, 1979, now abandoned.

Background of the Invention

1. Field of the Invention

The present invention relates to a magnetic tape cassette having a recorded sound cancellation-preventing device.

2. Description of the Prior Art

A recorded sound cancellation-preventing means of the conventional magnetic tape cassette comprises a recess (1) for receiving a pin (not shown) projecting from a safety device which controls actuation of the recording control circuit of a tape recorder and a pawl (2) covering the opening portion of the recess as shown in FIG. 1. It is always possible to actuate the recording circuit of the tape recorder since the pawl (2) prevents insertion of the pin. On the other hand, if preservation of the recorded sound is desired, the pawl (2) is cut and removed. Thus, even though an operator switches the tape recorder to recording mode in error, the pin of the safety device of the tape recorder can enter into the recess (1) to prevent the actuation of the recording circuit thereby preventing erroneous cancellation of the magnetic tape.

However, once the pawl (2) has been removed and when cancellation of the recorded sound or a new recording is desired, special care is required to pack into the recess (1) a packing prepared by shaping an elastic material such as an eraser.

SUMMARY OF THE INVENTION

It is an object of the invention to overcome the disadvantage of the conventional tape cassette and to provide a recorded sound cancellation-preventing device enabling selection of recording condition or non-recording condition of the tape cassette.

The foregoing and other objects of the invention have been attained by providing a magnetic tape cassette comrpising a recess adapted for inserting a recorded sound cancellation-preventing pin of a tape recorder and a fitting piece which can be fitted into the recess in two different positions wherein a projection is provided on the inner wall of the recess; the fitting piece is formed in a channel-like shape having two legs; a cooperative lug is formed on at least one of the legs which is engaged with the projection whenever the fitting piece is fitted into the recess in either one position; an extension extends from the end of the middle portion of the fitting piece over the end of the legs; and a slot is formed in the bottom of the recess to receive the extension when the fitting piece is fitted into the recess in a specific position.

BRIEF DESCRIPTION OF THE DRAWINGS

FIG. 2 is a sectional front view of an embodiment of a recorded sound cancellation-preventing device according to the present invention;

FIG. 3 is a plane view of the device of FIG. 1;

FIG. 4 is a slant view of a fitting piece of the recorded sound cancellation-preventing device according to the present invention;

FIG. 5 is a sectional front view similar to FIG. 2 in which the fitting piece is fitted in a recess in the first position;

FIG. 6 is a sectional front view in which the fitting piece is fitted in the recess in the second position; and FIG. 7 is a slant view partially removed of the fitting piece of the pressent invention.

DETAILED DESCRIPTION OF THE PREFERRED EMBODIMENT

Figure 1:
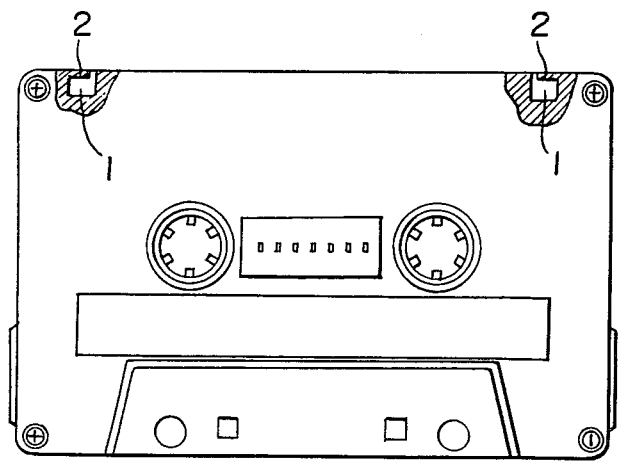
FIG. 1 is a front view partially sectioned of the conventional magnetic tape cassette having a recorded sound cancellation-preventing means.
Figure 1:
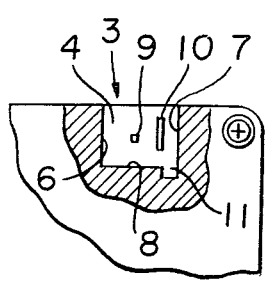
Figure 1:
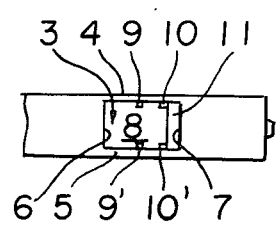
Figure 1:
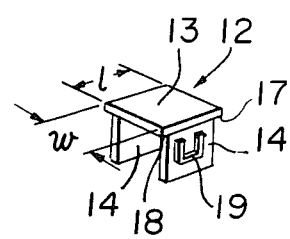
Figure 1:
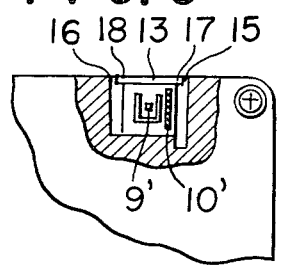
Figure 1:
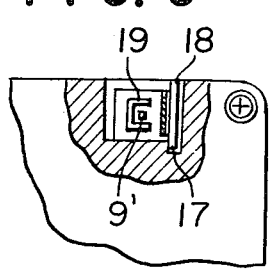
Figure 1:
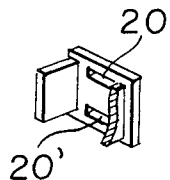

An embodiment of the present invention is shown in FIG. 2 to FIG. 6. FIG. 2 is a front view partially sectioned of a recess of a tape cassette according to the present invention and FIG. 3 is a plane view of the recess. The recess (3) is a rectangular recess formed in a position suitable for receiving the pin of the safety device of a tape recorder and is similar to the recess (1) of the conventional one and the recess (3) is defined by a front wall (4), a rear wall (5), a left side wall (6), a right side wall (7) and a bottom wall (8). A projection (9) is formed in the middle of the inner surface of the front wall (4) and a projection (9') is also formed in the middle of the inner surface of the rear wall (5) is one piece respectively. A vertically elongated projection (10) is formed on the inner surface of the front wall (4) and a vertically elongated projection (10') is also formed on the inner surface of the rear wall (5), both being in a position near the right side wall (7). The effect of the invention can be attained even if either one of the walls having the projections (9), (9') and the elongated projections (10), (10') is omitted. However, a superior effect can be obtained by using the walls each provided with the projections (9), (9') and (10), (10'). A slot (11) is formed in the bottom wall (8) in the right side.

FIG. 4 is a slant view showing the fitting piece for preventing cancellation of the recorded sound in conjunction with the recess (3) shown in FIGS. 2 and 3. The fitting piece, which is made of a relatively hard plastic material having some elasticity (it may be made of the same material as the body of the tape cassette), has a substantially channel-shaped plate formed by a flat middle portion (13) and a pair of legs (14), (14') perpendicularly extending from the opposite sides of the middle portion (13). The width W of the middle portion (13) is slightly less than the distance between the front wall (4) and the rear wall (5) of the recess (3). The length 1 of the middle portion is determined so that a gap of about 1 mm (which allows the tip of the thin body such as a ball-point pen, a safety pin etc. to pass) is formed at a position (15) and/or (16) when the fitting piece is fitted in the recess (3) with its middle portion upward and horizontal as shown in FIG. 5. The length of the legs (14), (14') correspond to the depth of the recess (3) so that the top surface of the fitting piece is flush with the top surface of the tape cassette when the fitting piece (12) is fitted into the recess (3). A thin, elongated lug (19) is respectively formed on the legs (14), (14') so as to take the position below the projection (9) whenever the fitting piece (12) is fitted in the recess (3) in two different positions as shown in FIGS. 5 and 6 (the lug (19) formed on the leg (14') is not shown in the figures). The length of middle portion (13) is greater than that of the legs (14), (14') so that extensions (17), (18) are formed at the opposite ends of the middle portion. The extensions are formed so as to just fit to the slot (11) of the recess (3). The distance between the top of the lugs (19) both extending from the legs preferably corresponds to the width of the middle portion of the fitting piece. A pair of channels (20), (20') are formed in the rear surface of the middle portion (13) so that the tip of the ball-point pen can engage with the elements (FIG. 7).

In the structure of the recorded sound cancellation-preventing device of the invention, the cancellation-preventing operation and the recording operation are selectively performed. When the fitting piece (12) is fitted in the recess (3) in the position of FIG. 5, the lug (19) passes over the projections (9), (9') due to the elasticity of the legs to take the position of FIG. 5. At this time, the gap (15) is formed or the gaps (15), (16) are formed between the edge of the middle portion and the wall (6) and/or the wall (7). This condition permits the recording operation.

If prevention of the cancellation is needed after completion of the recording, the operation is as follows. The tip of the ball-point pen is inserted in the gap (15) or (16) and is lifted up whereby the lug (19) of the fitting piece (12) is elastically passed over the projections (9), (9') to be detached from the recess (3). Then, the position of the fitting piece (12) is shifted 90 degress to face the extensions (17), (18) to the slot (11) and the fitting piece is again pushed into the recess. The lug (19) is elastically passed over the projections (9), (9') to fit in a suitable position and the extensions (17), (18) (the fitting piece is formed symmetrically) are also fitted in the slot (11). Thus, the lateral movement of the fitting piece is prevented by the engagement of the extension (17) or (18) and the slot (11) and the engagement of the projections (9), (9') and the lug (19) and the vertical movement is prevented by the engagement of the projection (9), (9') and the lug (19). Accordingly, the pin of the safety device of the tape recorder can be inserted between both legs of the fitting piece (13) since a space between the legs is opened in the upward direction thereby preventing erroneous recording. The elongated projections (10), (10') cooperate with the edge of the middle portion (13) of the fitting piece to reduce a rattle.

If renewal or cancellation of the recorded sound is required, the fitting piece can be detached by its nature of elasticity by engaging the tip of the ball-point pen with the channel (20) or (20') to pull the fitting piece up.

As stated above, the recorded sound cancellation-preventing device of the magnetic tape cassette has a simple and flexible structure, and is contributive to the field of the art.

Various modifications can be attained according to the nature of the invention. For example, the desired effect can be attained, even though either one of the projections (9) and (9') is omitted as long as the fitting piece is formed symmetrically. A similar effect can also be attained even with the omitting of one of the lugs (19) and using both projections (9) and (9').

I claim:

1. A magnetic tape cassette, comprisig:

a cassette casing having a first surface including a tape reading aperture and a second surface opposite said first surface;

at least one recess on said second surface, each said at least one recess including opposing lateral walls, a bottom wall, a projection centrally located on each of said lateral walls and a slot extending in said bottom walls; and an elastic fitting piece for each said at least one recess, each said fitting piece forming a channel shape including two legs and a connecting portion and being symmetric about a plane passing centrally through said legs and connecting portion, each of said legs including a lug forming an enclosing mating portion, each said lug being centrally located on one of said legs and on said plane of symmetry, said connecting portion including an extending portion which extends beyond said legs;

wherein said fitting piece is adapted to fit into said recess in either of two positions, a first position in which each said enclosing mating portion of each said lug is matingly engaged with one of said projections and said connecting portion covers all of said recess except for a portion corresponding to said slot, and a second position in which each said enclosing mating portion of each said lug is matingly engaged with one of said projections and said connecting portion is perpendicular to said bottom wall to uncover said recess, with said extending portion engagingly inserted in said slot to prevent lateral movement of said fitting piece, whereby said fitting piece maybe moved from one of said two positions to the other of said two positions with said plane of symmetry in either of two opposite angular orientations.

2. A magnetic tape cassette according to claim 1 wherein a second elongated projection is formed on at least one of said lateral walls of the recess.

3. A magnetic tape cassette according to claim 2 wherein said second elongated projection is formed on both said lateral walls.

* * * * *